Jan. 14, 1930.　　A. E. ANDERSON　　1,743,748
SYSTEM OF ELECTRIC DISTRIBUTION
Filed Jan. 26, 1929
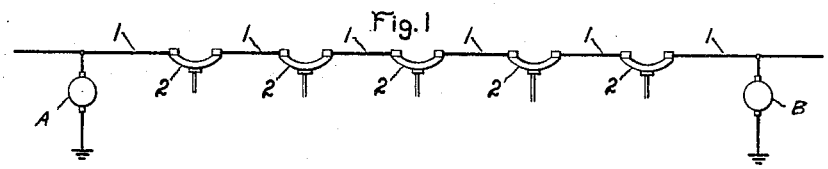
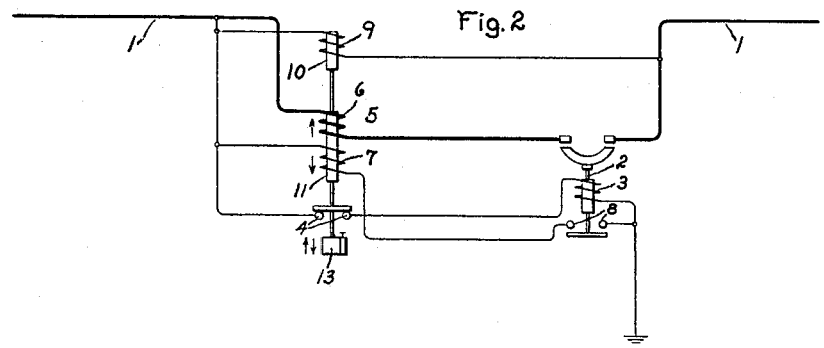
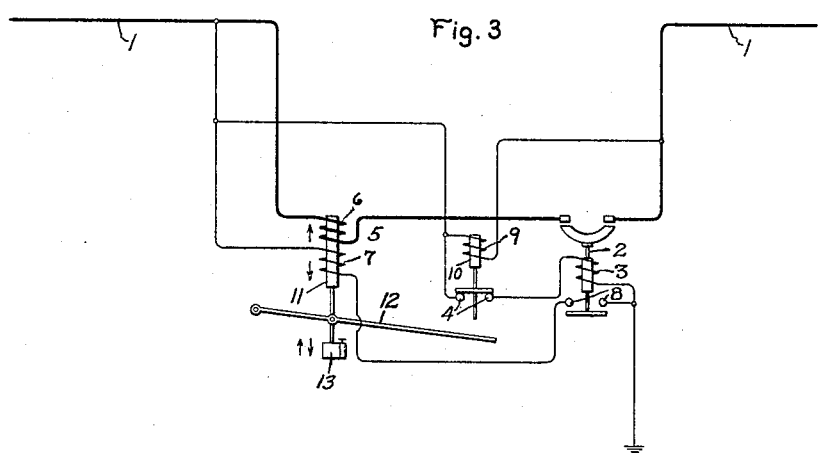
Inventor:
Arvid E. Anderson,
by Charles E. Mullen
His Attorney.

Patented Jan. 14, 1930

1,743,748

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

SYSTEM OF ELECTRIC DISTRIBUTION

Application filed January 26, 1929. Serial No. 335,377.

My invention relates to systems of electric distribution and particularly to a system comprising a plurality of sections connected in series with each other and its object is to provide an improved arrangement for effecting the disconnection of a faulty section from the system without effecting the disconnection of any of the normal sections and for automatically reconnecting the disconnected section to the system when the fault on the disconnected section is removed.

My invention will be better understood from the following description when taken in connection with the accompanying drawing and its scope will be pointed out in the appended claims.

In the accompanying drawing, Fig. 1 is a diagram of a system of distribution to which my invention is particularly applicable, Fig. 2 is a diagram of a control arrangement embodying my invention which may be used to control the sectionalizing switches shown in Fig. 1, and Fig. 3 is a modification of the control arrangement shown in Fig. 2.

Referring to the system of distribution shown in Fig. 1, a plurality of sections 1 of an electric circuit are connected in series by the sectionalizing switches 2. The end sections of the system are arranged to be supplied with energy from suitable sources of current, such as the sources A and B. Such an arrangement of series-connected sections is usually provided so that a fault at any point on the system causes the deenergization of only a small portion of the total system. It is also desirable that a section in such a system should be reconnected to the system as soon as the fault on the section has been removed.

In Fig. 2 I have shown a control arrangement embodying my invention which may be used to control each of the sectionalizing switches 2 in Fig. 1 so as to accomplish this result. Each switch is provided with a closing coil 3 which is arranged to be connected across one of the adjacent sections, by means of the contacts 4 of a combined overload and reclosing control relay 5. The relay 5 is provided with three windings, a current winding 6 which is connected in any suitable manner so that it is energized in response to the current through the associated switch 2, when closed, an opposing voltage winding 7 which is arranged to be connected across one of the adjacent sections 1 by auxiliary contacts 8 on the switch 2 when closed, and a winding 9 which is connected so as to be responsive to the relative voltages of the adjacent sections 1 when the switch 2 is open. As shown, the winding 9 is connected across the terminals of the switch 2 so that it is energized in response to the voltage difference between the two adjacent sections when the switch is open.

When each switch 2 is closed, the coil 9 of the associated control relay 5 is substantially deenergized and the windings 6 and 7 are respectively energized in response to the current through the switch and the voltage across the system at the point where the switch is located. The windings 6 and 7 are so designed that the winding 7 above, when normal voltage is impressed thereon, cannot open the contacts 4, and it requires a predetermined abnormal current through the winding 6 to produce sufficient torque to open the contacts 4 when both of the windings 6 and 7 are energized.

While I have shown the two windings 6 and 7 differentially arranged on the same core it is obvious that my invention is not limited to any particular relay construction. It is only essential that these two windings oppose each other in any suitable manner examples of which are well known in the art so that resultant torque exerted thereby varies in accordance with the ratio or difference between ampere turns of the two windings.

Preferably each relay 5 is provided with a suitable time delay means such as a dashpot 13 having an inverse time limit feature so that it allows faster operation in case a greater pull is exerted on the moving element of the relay. Therefore when a fault occurs on any section, so that the lowest voltage of the system is across the faulty section, the voltage coils 7 of the relays 5 associated with the switches at the end of the faulty section exert the least pulls and consequently these relays respond more quickly to the overcurrent due to the fault than any of the other control relays. The control relays 5 controlling the switches at the end of the faulty section, therefore, effect the disconnection of the faulty section before any of the other control relays 5 can effect the opening of their associated switches. In this manner only the faulty section is disconnected when a fault occurs on any section.

As soon as switch 2 opens, its auxiliary contacts 8 open the energizing circuit of the voltage winding 7 of the associated control relay 5 and the main contacts of the switch 2 open the circuit of the current coil 6 so that the reclosing of the contacts 4 depends solely upon the energization of the winding 9 which is preferably wound on a different core 10 from the core 11, on which the windings 6 and 7 are wound. The two cores 10 and 11, however, are permanently connected together. As soon as the fault on the disconnected section is removed so that the voltage difference between it and the adjacent section is below a predetermined value the relay 5 closes its contacts 4 and reenergizes the closing coil 3 of the associated switch 2 so that the switch closes and reconnects the two adjacent sections together.

In the modification of Fig. 2 shown in Fig. 3, the windings 6 and 7 and the winding 9 are wound on independent cores 11 and 10 respectively and the contacts 4 are arranged to be bridged by a member which is mounted on the core 10 on which the winding 9 is wound. Suitable means, examples of which are well known in the art, are provided whereby the core 11 when operated by the winding 6 in response to an overload also mechanically moves the core 10 into its energized position so that the contacts 4 are opened and the closing coil 3 is deenergized. As shown, this result is obtained by providing the core 11 with a member 12 which engages a projection on the core 10 so that when core 11 moves upward the member 12 causes the core 9 also to move upward and open contacts 4. The operation of the arrangement shown in Fig. 3 is the same as the arrangement shown in Fig. 2 except that the core 11 is restored to its normal position independently of the core 10 after the switch 2 opens. The coil 9 however does not allow the contacts 4 to close until the voltage difference is below a predetermined value.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:

1. In combination, an electric circuit comprising a plurality of sections connected in series by a plurality of switches, means for controlling the selective opening of said switches including an overload relay associated with each switch having a winding connected so as to be responsive to the current through the associated switches and an opposing winding responsive to the voltage across the circuit adjacent to the associated switch, means for effecting the deenergization of a voltage winding when the associated switch is open and the energization of the voltage winding when the associated switch is closed, and automatic reclosing means for closing each switch.

2. In combination, an electric circuit comprising a plurality of sections connected in series by a plurality of switches, means for controlling the selective opening of said switches including an overload relay associated with each switch having a winding connected in series relation with said circuit and a voltage winding connected across the circuit adjacent to the associated switch, contacts in the circuit of each voltage winding controlled by the associated switch so that the circuit of the voltage winding is open when the associated switch is open, and automatic reclosing means responsive to the relative voltages of two adjacent sections for closing the switch between the two adjacent sections.

3. In combination, an electric circuit comprising a plurality of sections connected in series by a plurality of switches, means for controlling the selective operation of said switches including an overload relay associated with each switch having a winding connected in series relation with said circuit and a voltage winding connected across the circuit adjacent to the associated switch and a third winding responsive to the relative voltages of the adjacent sections when the associated switch is open, and contacts in the circuit of each voltage winding controlled by the associated switch so that the voltage winding is deenergized when the associated switch is open.

4. In combination, two sections of an electric circuit, a switch connecting said sections having a closing coil, and means for controlling the circuit of said closing coil including a relay having a winding responsive to the current through said switch when closed, an opposing winding responsive to the voltage across one of the sections adjacent to the switch, a third winding responsive to the relative voltages across said sections when the switch is open, and means controlled by said switch for deenergizing said differential winding when the switch is open.

5. In combination, an electric circuit comprising a plurality of sections connected in series by a plurality of switches, means for controlling the selective opening of said switches including an overload relay associated with each switch having a winding connected so as to be responsive to the current through the associated switch and an opposing winding responsive to the voltage across the circuit adjacent to the associated switch, and automatic reclosing means for closing each switch.

6. In combination, an electric circuit comprising a plurality of sections connected in series by a plurality of switches, means for controlling the selective opening of said switches including an overload relay associated with each switch having a winding connected so as to be responsive to the current through the associated switch and an opposing winding responsive to the voltage across the circuit adjacent to the associated switch, time delay means for controlling the operation of each relay and automatic reclosing means for closing each switch.

In witness whereof, I have hereunto set my hand this 22nd day of January 1929.

ARVID E. ANDERSON.